Aug. 9, 1955 E. A. FIERBAUGH ET AL 2,715,041
SHOCK ABSORBING AND SUSPENSION MEANS FOR VEHICLE BODIES
Filed Sept. 14, 1953 4 Sheets-Sheet 1

INVENTORS.
Emmett A. Fierbaugh
BY Marland W. Garber
ATTORNEY.

Aug. 9, 1955     E. A. FIERBAUGH ET AL     2,715,041
SHOCK ABSORBING AND SUSPENSION MEANS FOR VEHICLE BODIES
Filed Sept. 14, 1953     4 Sheets-Sheet 2

INVENTORS.
Emmett A. Fierbaugh
BY Marland W. Garber
ATTORNEY.

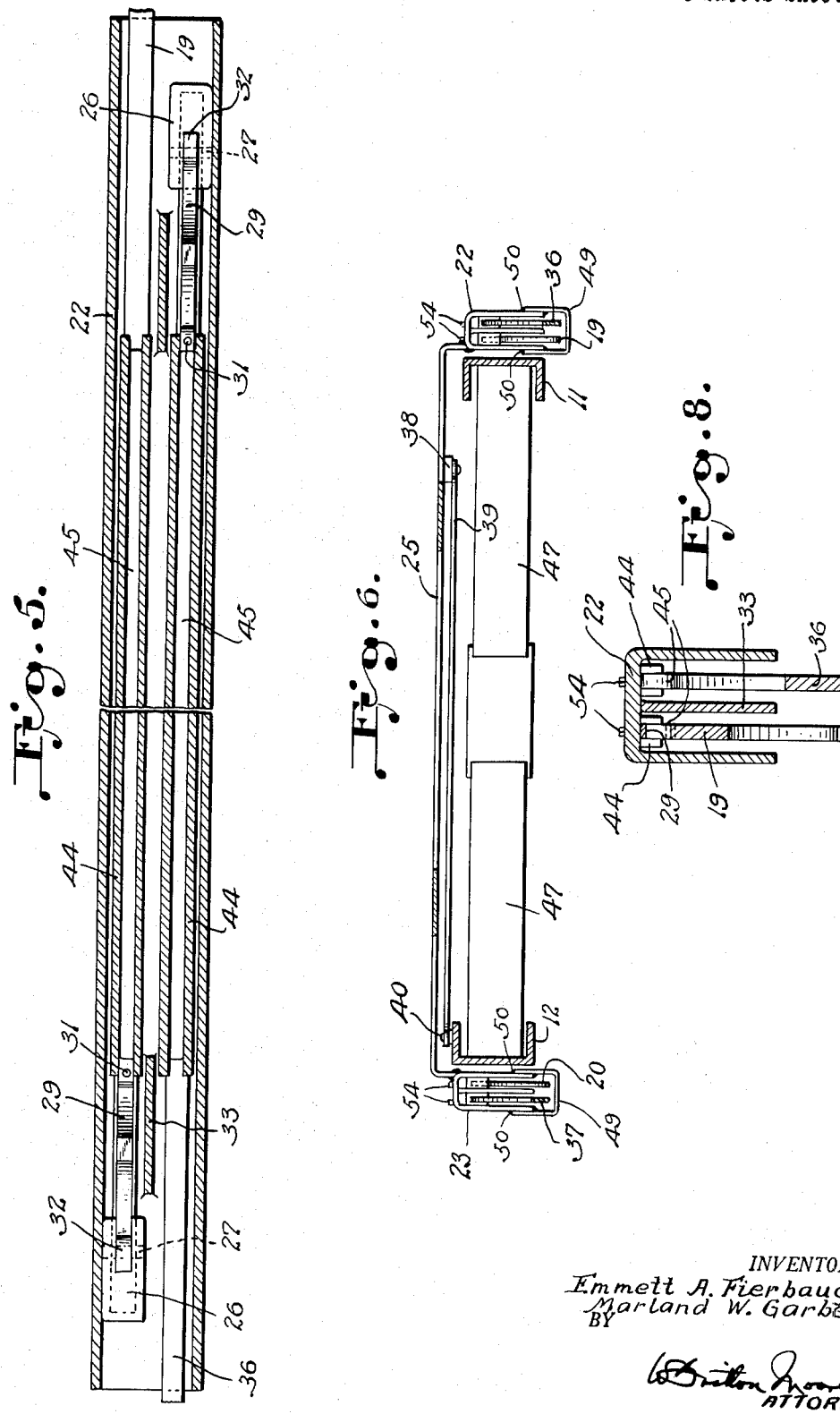

Aug. 9, 1955   E. A. FIERBAUGH ET AL   2,715,041
SHOCK ABSORBING AND SUSPENSION MEANS FOR VEHICLE BODIES
Filed Sept. 14, 1953   4 Sheets-Sheet 4
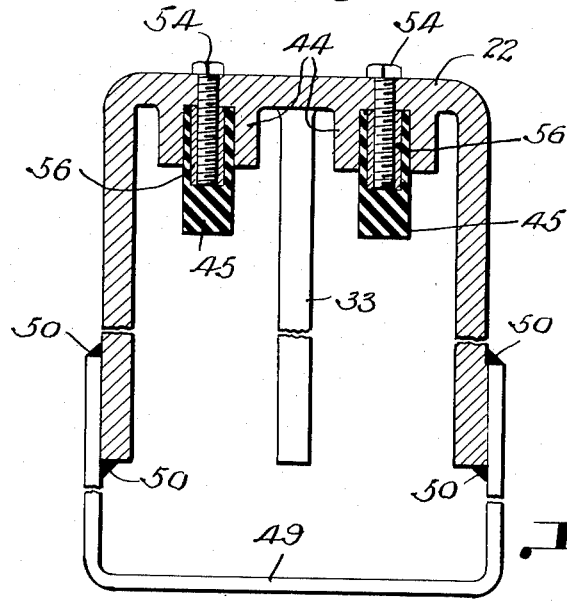
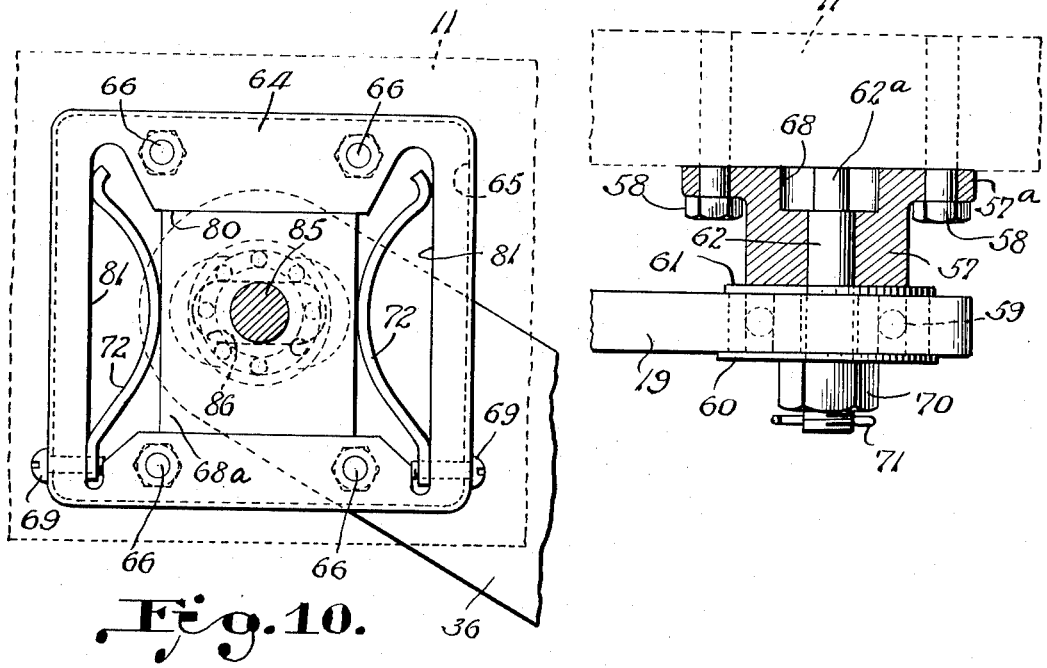
INVENTORS.
Emmett A. Fierbaugh
Marland W. Garber
BY
W. Britton Moore
ATTORNEY.

United States Patent Office 2,715,041
Patented Aug. 9, 1955

2,715,041

SHOCK ABSORBING AND SUSPENSION MEANS FOR VEHICLE BODIES

Emmett A. Fierbaugh, Ashland, and Marland W. Garber, Orrville, Ohio

Application September 14, 1953, Serial No. 379,846

4 Claims. (Cl. 296—35)

The present invention relates to a vehicle suspension and it consists in the combinations, constructions and arrangements of parts herein described and claimed.

Generally the present invention consists of a mechanism which is interposed between the conventional chassis of a vehicle and the conventional body thereof and the device is so constructed as to absorb to a large degree both vertical and lateral shocks due to uneven road conditions. The device embodies many novelties which will be brought forth in the accompanying description.

It is an object of the invention to provide a device of the character set forth which is simple in construction, inexpensive to manufacture and yet effective and efficient in use.

Another object of the invention is to provide, in a device of the character set forth, novel means for absorbing vertical shock received by the wheels and chassis of a vehicle to prevent the same from being imparted to the body of such vehicle.

A further object of the invention is to provide, in a device of the character set forth, novel means for absorbing lateral shock imparted to the wheels and chassis of a vehicle to prevent the same from being imparted to the body of such vehicle.

Another object of the invention is to provide, in a device of the character set forth, novel buffers of resilient material forming parts of the invention.

A further object of the invention is to provide, in a device of the character set forth, moved springs forming a part of the invention.

Other and further objects of the invention will become apparent from a reading of the following specification taken in conjunction with the drawings, in which:

Figure 4 is an enlarged fragmentary vertical sectional view of the device illustrated in Figure 1.

Figure 5 is a sectional view taken substantially along line 5—5 of Figure 4.

Figure 6 is an enlarged sectional view taken along line 6—6 of Figure 1.

Figure 7 is a greatly enlarged sectional view, partly broken away and with certain parts removed, taken substantially along line 7—7 of Figure 4.

Figure 8 is an enlarged fragmentary sectional view taken along line 8—8 of Figure 4.

Figure 9 is an enlarged fragmentary view, partly in section of a forward bearing assembly forming a part of the invention, and Figure 10 is a like view of a rearward bearing assembly likewise forming a part of the invention.

Figure 1:
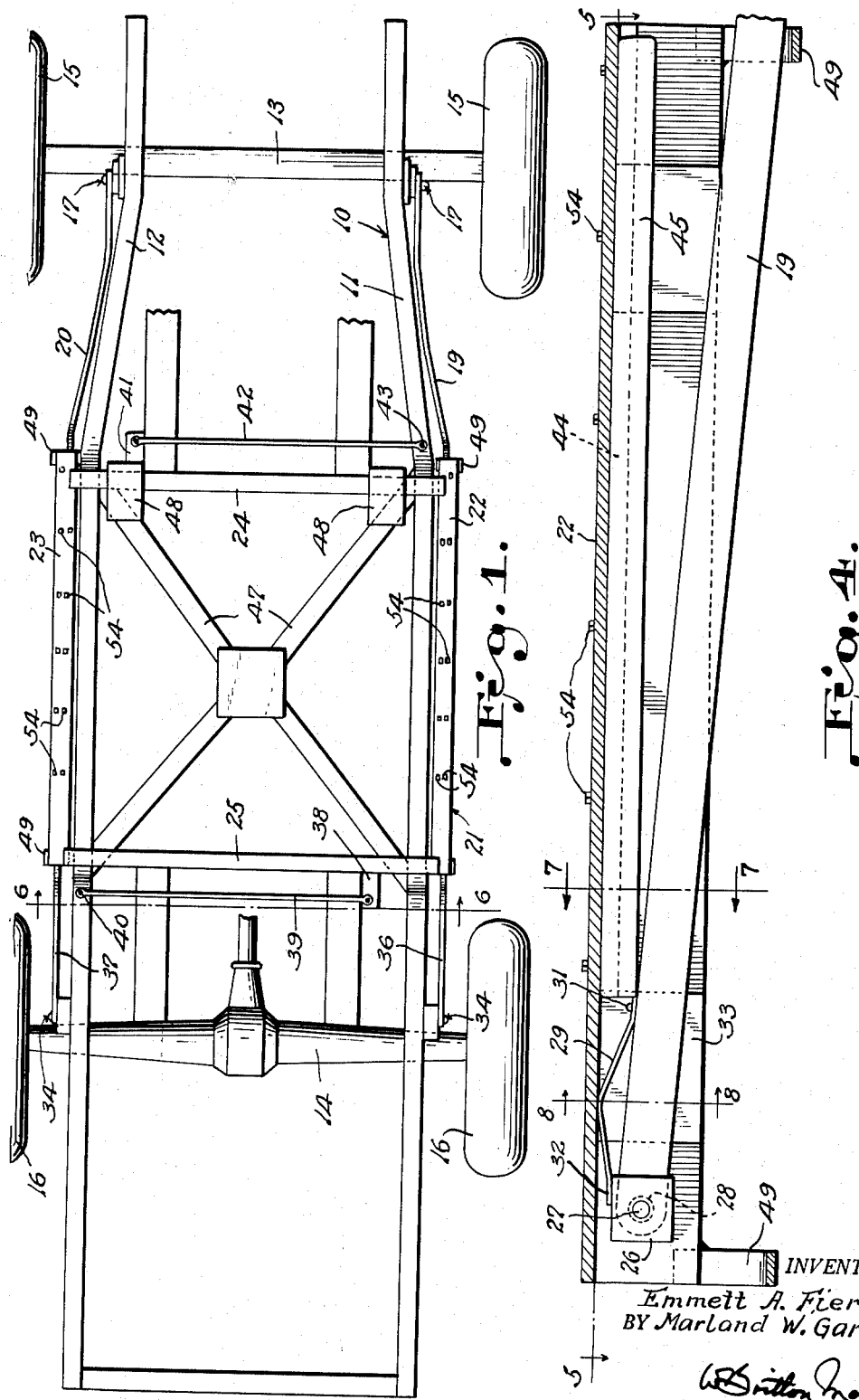
Figure 1 is a plan view of an embodiment of the invention.
Figure 2:
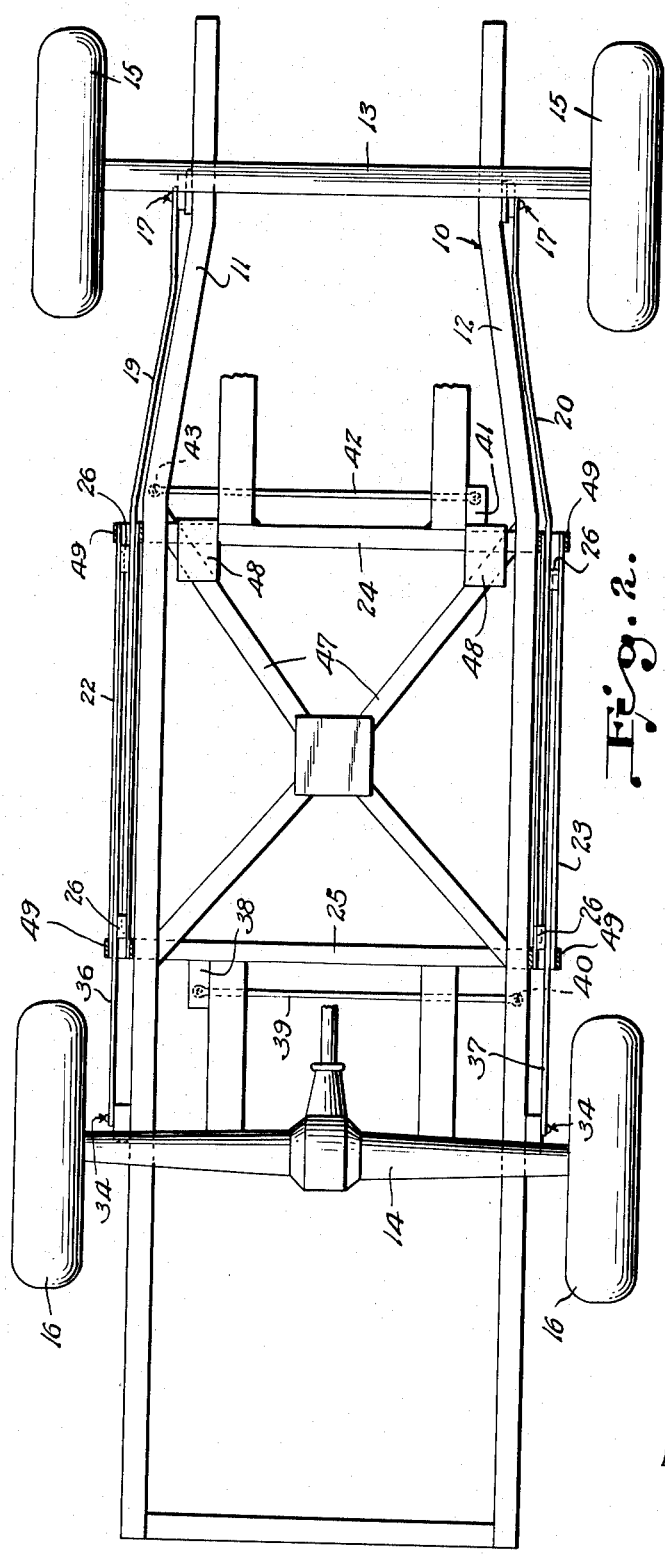
Figure 2 is a bottom plan view thereof.
Figure 3:
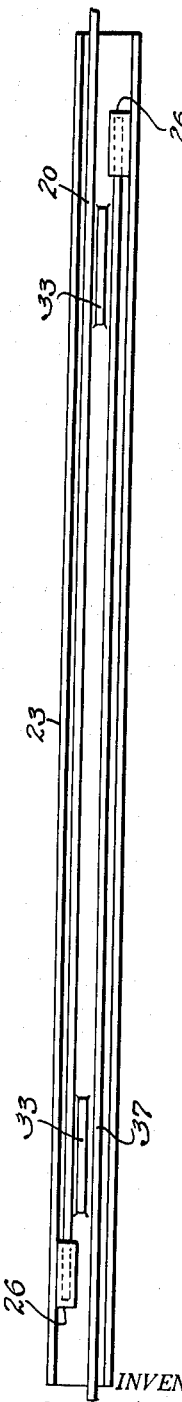
Figure 3 is an enlarged fragmentary portion of the view illustrated in Figure 2.

Referring more particularly to the drawings, there is shown therein an automotive vehicle having a conventional chassis generally designated at 10 and including side bars 11 and 12, a forward axle 13, a rearward axle 14, front wheels 15 and rear wheels 16.

Pivotally connected to the forward portion of the outer side of each of the side bars 11 and 12 as generally indicated at 17, is a pair of elongated rearwardly extending support arms 19 and 20, likewise respectively.

A frame is generally designated at 21 and includes a pair of inverted U-shaped channel members 22 and 23 which lie, respectively, immediately outwardly of the side bars 11 and 12. A forward brace bar 24 interconnects the forward end portions of the channel members 22 and 23 while a like rearward brace member 25 interconnects the rearward end portions of the channel members 22 and 23.

In the forward end portion of each of the channel members 22 and 23 there is affixed adjacent the inner wall thereof a block 26 having a suitable recess for the reception therein of the rearward end of the support bars 19 or 20, as the case may be. A pin 27 equipped with a bearing 28 extends through the block 26 and the adjacent portion of the contained support bar.

An inverted V-shaped spring 29 has its apex portion bearing against the underside of each of the channel members 22 and 23 and has its forward leg affixed to the upper side of the adjacent support bar 19 or 20, as indicated at 31, while the free end of the other leg bears against the upper side of its associated block 26, as indicated at 32.

Each of the channel members 22 and 23 is provided with a pair of spaced centrally disposed longitudinally extending partition members 33 which provide inner and outer channels and it will be seen that the bars 19 and 20 extend for a portion of their length through the inner channels of the channel members 22.

Pivotally connected to the outer sides of the side bars 11 and 12 of the chassis 10 rearwardly of the frame 21, as generally indicated at 34, are the rearward ends of forwardly extending support bars 36 and 37, the forward ends of such bars 36 and 37 extending through the outer channels of the channel members 22 and 23, respectively. Blocks 26 and springs 29 are provided in the channel members 22 and 23 for the forward ends of the bars 36 and 37 are identical with those heretofore described with reference to the bars 19 and 20.

The bar 25 has affixed thereto inwardly of the side bar 11 a rearwardly extending bracket 38 to the outer end portion of which is connected one end of a link 39 which extends transversely with respect to the longitudinal axis of the chassis 10 and which has its other end affixed to the side bar 12, as indicated at 40. The brace member 24 has affixed thereto a forwardly extending bracket 41 which lies inwardly of the side bar 12 and which has connected to its outer end portion a transversely extending link 42 which has its other end connected to the side bar 11, as indicated at 43.

In each of the inner and in each of the outer channels of the channel members 22 and 23 there is provided upon the underside of the bight portion thereof an elongated longitudinally extending socket 44 in which is mounted, in each case, a vertically dependent elongated longitudinally extending buffer member 45 preferably formed of rubber or like flexible yieldable material. The buffer strip 45 has embedded therein a plurality of interiorly threaded shells 56 and a series of cap screws 54 extends through the channel members to threadably engage in such shells to maintain the buffer strips in position. If desired, the buffer strip 45 could be vulcanized or otherwise secured, in an obvious manner not shown, to a flat elongated strip of metal so that the strip with the buffer secured thereto may be slidably positioned within the sockets 44. In this form, screws would likewise extend through apertures in the plate and buffer strip to anchor the same within the sockets.

A guard 49, which is preferably U-shaped in cross sectional area, is affixed in any suitable manner, as by welding 50, to the dependent legs of each of the channel members 22 and 23.

One of the front pivotal bearings which have been generally indicated at 17, is shown in greater detail in Figure 9 and consists in a generally cylindrical casting 57 having an integrally formed flange 57a which is affixed to the frame by means of cap screws 58 or the like. The casting 57 is provided with a recess 68 in its inner face for the reception therein of a bolt head 62a of a bolt 62 which extends through and out of the casting and thence through the adjacent arm 19 or 20, as the case may be after which a nut 70 and cotter pin 71 are assembled thereon. A bearing 59 for the bolt 62 is mounted in the arm 19 and a pair of washers 60 and 61 are mounted, one at either side of the arm, upon the bolt 62.

One of the rear pivotal bearing assemblies which has been generally designated at 34 is shown more in detail in Figure 10 and consists in each case of a body 64 affixed by screws 66 or the like to the frame and having a horizontally disposed opening 80 therein wherein is horizontally slidable a block 68a. Enlarged openings 81 are formed in the body 64 and connect with either end of the opening 80. An inwardly bowed spring 72 is affixed in the lower end of each of the openings 81 by means of a screw 69 and the bowed portion thereof bears, in each case, against one end of the block 68a. The arms 36 and 37 are each provided with a pin 85 which extends through a bearing 86 mounted in the block 68a and a cover plate 65 is mounted upon the body 64 and is provided with a slot 86 which permits longitudinal movement of the pin 85 against the action of the springs 72.

In operation, it will be apparent that the body of the vehicle will be mounted upon the frame 21 and that it may also, if desired, be supported upon the chassis 10 in addition thereto by a pair of snubbers at the forward end and a pair of snubbers at the rearward end, such snubbers not forming a part of the invention and accordingly not shown in the drawings. The chassis 10 is centrally provided with truss members 47 to which straps 48 or the like may be affixed and which straps circle the brace bar 24 whereby to prevent separation of the body of the vehicle from the chassis in the event of overturning of the vehicle.

It will also be apparent that the support bars 19 and 20 extend forwardly and downwardly from their connections with their respective blocks 26 while the support bars 36 and 37 extend rearwardly and downwardly from their associated blocks 26. Thus it will be seen that when a vertical shock is given to any of the wheels 15 or 16 due to inequalities in road surface over which the vehicle embodying the present invention may be passing, that such vertical shocks will be gradually absorbed by the yieldable member 45 associated with the support bar 19, 20, 36 or 37 which is pivotally connected adjacent the particular wheel receiving such shock. This is due to the fact that the support bar is moved in an upward direction upon its particular pivotal point 17, 18, 34 or 35, as the case may be thus gradually bringing the support bar into contact with its associated buffer member 45. It will also be apparent that if the forward ends of the bars 19 or 20 move vertically with the chassis as a result of road shock, that the opposite ends of the bars 19 or 20 will move vertically only a fraction of the vertical movement of the front ends and that the reverse of this is true with respect to the bars 36 and 37.

It will likewise be apparent that the rear bearing assemblies permit not only pivotal movement but also horizontal movement due to the action of the blocks 68 in their openings 80 against the action of the springs 72. Side sway of the body is prevented nevertheless by the links 39 and 42 which interconnect the frame 21 with the side bars 11 and 12 of the chassis 10. As any of the support bars 19, 20, 36 or 37 is moved upwardly as heretofore described due to road shock, it will also be seen that the spring 29 connected thereto will likewise act to absorb such shock, it being apparent that one leg of such spring frictionally engages the underside of the channel member 22 or 23 thus permitting a sliding movement of such leg to cushion and absorb the shock. At the same time, the free end 32 of the spring 29 is permitted to slide upon the upper side of its associated block 26.

While but one form of the invention has been shown and described herein, it will be readily apparent to those skilled in the art that many minor modifications may be made without departing from the spirit of the invention or the scope of the appended claims.

What is claimed is:

1. A device of the character described comprising, in combination with a vehicle chassis, said chassis including a pair of side bars, the provision of a body-supporting frame, a pair of rearwardly extending support bars each pivotally connected at its forward end to the forward portion of one of said side bars and pivotally connected at its rearward end to the rearward end portion of one side of said frame, and a pair of forwardly extending support bars each pivotally and yieldably connected at its rearward end to the rearward portion of one of said side bars and pivotally connected at its forward end to the forward end portion of one side of said frame, said frame including a longitudinally extending inverted U-shaped channel member outwardly of each of said side bars, a centrally disposed longitudinally extending partition dependent from each end portion of the bight portion of each channel member dividing each of said channel members into an inner end and an outer channel, blocks arranged in the ends of said channels, and said support bars extending into said channels with each pair thereof being pivotally connected at one end to said blocks.

2. A device as defined in claim 1 wherein each channel has mounted therein a longitudinally extending buffer of yieldable material in contact with its associated arm and wherein said support bars normally extend at a slight angle to said buffers.

3. A device of the character described comprising, in combination with a vehicle chassis, said chassis including a pair of side bars, the provision of a body-supporting frame, a pair of rearwardly extending support bars each pivotally connected at its forward end to the forward portion of one of said side bars and pivotally connected at its rearward end to the rearward end portion of one side of said frame, and a pair of forwardly extending support bars each pivotally and yieldably connected at its rearward end to the rearward portion of one of said side bars and pivotally connected at its forward end to the forward end portion of one side of said frame, said connections between the rearward ends of said forwardly extending support bars including in each case a pin carried by the support bar, a body member mounted on the side bar, a block horizontally slidable in said body member, a bearing for said pin mounted in said block, a resilient means carried by said body member and bearing against one end of said block.

4. A device of the character described comprising, in combination with a vehicle chassis, said chassis including a pair of side bars, the provision of a body-supporting frame, a pair of rearwardly extending support bars each pivotally connected at its forward end to the forward portion of one of said side bars and pivotally connected at its rearward end to the rearward end portion of one side of said frame, and a pair of forwardly extending support bars each pivotally and yieldably connected at its rearward end to the rearward portion of one of said side bars and pivotally connected at its forward end to the forward end portion of one side of said frame, said connections between the rearward ends of said forwardly extending support bars including in each case a pin carried by the support bar, a body member mounted on the side bar, a block horizontally slidable in said body member, a bearing for said pin mounted in said block, and a pair of springs carried by said body member and each bearing against one end of said block.

References Cited in the file of this patent

UNITED STATES PATENTS

| | | |
|---|---|---|
| 1,071,335 | Pembroke | Aug. 26, 1913 |
| 1,071,517 | Grant et al. | Aug. 26, 1913 |
| 1,398,810 | Story | Nov. 29, 1921 |
| 2,138,114 | Nelson | Nov. 29, 1938 |
| 2,606,019 | Smith et al. | Aug. 5, 1952 |

FOREIGN PATENTS

| | | |
|---|---|---|
| 9,777 of 1909 | Great Britain | July 1, 1909 |
| 24,849 of 1912 | Great Britain | July 3, 1913 |
| 655,460 | Great Britain | July 25, 1951 |